United States Patent [19]
Kaul et al.

[11] Patent Number: 5,965,716
[45] Date of Patent: Oct. 12, 1999

[54] DYESTUFF SALTS CONTAINING A CATIONIC GROUP DERIVED FROM A STERICALLY HINDERED AMINE

[75] Inventors: Bansi Lal Kaul, Biel-Benken, Switzerland; Angelos-Elie Vougioukas, Istanbul, Turkey

[73] Assignee: Clariant Finance (BVI) Limited, Tortola, Virgin Islands (Br.)

[21] Appl. No.: 08/843,103

[22] Filed: Apr. 25, 1997

Related U.S. Application Data

[62] Division of application No. 08/470,854, Jun. 6, 1995, Pat. No. 5,650,515, which is a continuation of application No. 08/166,410, Dec. 13, 1993, Pat. No. 5,510,467, which is a continuation of application No. 07/968,785, Oct. 30, 1992, abandoned, which is a continuation of application No. 07/689,408, Apr. 22, 1991, abandoned, which is a continuation-in-part of application No. 07/592,163, Oct. 3, 1990, abandoned.

[30] Foreign Application Priority Data

Oct. 3, 1989 [DE] Germany .............................. 39 32 913

[51] Int. Cl.$^6$ .......................... C09B 69/04; C09B 67/20; C08K 5/17
[52] U.S. Cl. .......................... 534/728; 546/19; 546/188; 548/517; 524/99; 524/105
[58] Field of Search ............................. 534/728; 546/19, 546/188; 548/517; 524/99, 105

[56] References Cited

U.S. PATENT DOCUMENTS

| | | | |
|---|---|---|---|
| 3,681,319 | 8/1972 | Lindberg | 534/664 |
| 3,684,765 | 8/1972 | Matsui et al. | 524/99 |
| 3,691,187 | 9/1972 | Grau | 548/159 |
| 3,778,228 | 12/1973 | Kuth et al. | 8/602 |
| 4,102,639 | 7/1978 | Zenhausern et al. | 8/547 |
| 4,115,379 | 9/1978 | Perrey et al. | 534/728 |
| 4,322,529 | 3/1982 | Kuster | 544/343 |
| 4,668,774 | 5/1987 | Loeffler et al. | 534/728 |
| 4,866,113 | 9/1989 | Bitterli et al. | 524/87 |
| 4,877,412 | 10/1989 | Pedrazzi | 8/437 |
| 4,935,063 | 6/1990 | Costanzi et al. | 106/506 |
| 4,992,495 | 2/1991 | Hari et al. | 524/106 |
| 5,151,505 | 9/1992 | Hari et al. | 534/728 |
| 5,304,244 | 4/1994 | Goldmann et al. | 106/493 |
| 5,316,553 | 5/1994 | Kaul et al. | 8/639 |
| 5,523,387 | 6/1996 | Goldmann et al. | 534/728 |
| 5,571,899 | 11/1996 | Kaul et al. | 534/728 |

FOREIGN PATENT DOCUMENTS

| | | |
|---|---|---|
| 331 | 12/1983 | European Pat. Off. . |
| 2032391 | 11/1970 | France . |
| 3434920 | 5/1986 | Germany . |
| 944409 | 12/1963 | United Kingdom . |
| 981050 | 1/1965 | United Kingdom . |
| 2156373 | 10/1985 | United Kingdom . |
| 2184743 | 7/1987 | United Kingdom . |
| 2220418 | 1/1990 | United Kingdom . |

OTHER PUBLICATIONS

Ferruti et al., J. Am. Chem. Soc. 92, 3704–3713 (1970).

*Primary Examiner*—Fiona T. Powers
*Attorney, Agent, or Firm*—Gabriel Lopez

[57] ABSTRACT

A salt of formula I $$F_n \cdot A \qquad (I)$$

in which F is the residue of a metal free anionic dyestuff having 1 to 4 acids groups, n is 1 to 2; and A is a group containing 1 to 4 sterically hindered amine groups and at least n ammonium or immonium groups.

5 Claims, No Drawings

DYESTUFF SALTS CONTAINING A CATIONIC GROUP DERIVED FROM A STERICALLY HINDERED AMINE

This is a division of 08/470,854 filed Jun. 6, 1995 (now U.S. Pat. No. 5,650,515) which in turn is a continuation of 08/166,410 filed Dec. 13, 1993, (now U.S. Pat. No. 5,510,467), which in turn is a continuation of 07/968,785 filed Oct. 30, 1992, (now abandoned), which in turn is a continuation of 07/689,408 filed Apr. 22, 1991 (now abandoned), which in turn is a continuation-in-part of 07/592,163, filed Oct. 3, 1990 (now abandoned).

The invention relates to new organic compounds which are practically water-insoluble salts of acid dyestuffs with basic compounds which have at least one sterically hindered amine group. These compounds are excellent as pigments, particularly for the dyeing of solvent-free and solvent-containing plastics materials.

According to the invention there is provided a salt of formula I

$$F_n \cdot A \quad (I)$$

in which F is the residue of a metal-free anionic dyestuff having m acid groups, n is 1 or 2;

m is 1 to 4; and

A is group containing 1 to 4 sterically hindered amine groups, whereby from 1 to n×m ammonium and/or immonium groups are present in a salt of formula I.

Preferably the acid groups are selected from sulpho and carboxy.

Where the number of ammonium and immonium groups in A is fewer than the number of acid groups in $F_n$, any excess acid groups are in free acid form. All other acid groups are in salt form.

In this specification a sterically hindered amine group is preferably one containing a 2,2,6,6-tetralkylpiperidinyl group, preferably wherein each alkyl is $C_{1-4}$alkyl, more preferably methyl.

The pigments according to the invention are excellent for coloring PVC, all types of polyolefin (HDPE or LDPE (high density polyethylene or low density polyethylene) or polypropylene) polyisobutylene, poly-4-methylpentene and copolymers of these. Further, the compounds according to the invention can be used for coloring polystyrene (and copolymers thereof), ABS, Polyvinylacetate, Polyvinylalcohol, Polyacetates, Polyether (POM), Polyacrylates, Polyacrylonitrile, Polyacrylamide, Polyvinylidenechloride, Polyesters, Polyethers, Polythioethers and Thioplasts, Polycarbonates, Polyurethanes, Cellulose derivatives, Maleic acid, Melamine, Phenol, Aniline, Furane, Carbamide, Epoxide and Silicone resins. The compounds of formula I can also be used in lacquers and printing inks for the graphics industry.

Preferably F is F', where F' is a group derived from an acid group-containing non-metallised dyestuff of the azo series, of the phthalocyanine series, of the anthraquinone series, of the perylene series, of the indigo series, of the thioindigo series, of the pyrazolone series, of the perinone series, of the quinacridone series, of the dioxazine series, of the isoindoline series, of the isoindolinone series, of the diketopyrrole series or of the pyrrole series, especially of the azo, the phthalocyanine, the indigo, the anthraquinone, the dioxazine and the isoindoline series.

Preferably F' is Fa, where Fa is a group derived from an acid-containing non-metallized dyestuff of the azo, anthraquinone or pyrazolone series. More preferably, Fa is Fb where Fb is selected from a group derived from compounds of formula II, III or IV:

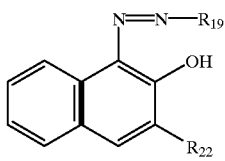

(II)

wherein each $R_{20}$ independently is halogen, $C_{1-4}$alkyl, $C_{1-4}$alkoxy and hydrogen and $R_{21}$ is hydrogen, sulpho, $C_{1-4}$alkyl, $C_{1-4}$alkoxy, halogen, —C(halogen)$_3$ or

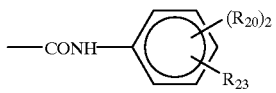

$R_{22}$ is carboxy or

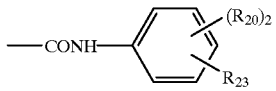

wherein $R_{23}$ is sulpho, halogen, $C_{1-4}$alkyl, $C_{1-4}$alkoxy or hydrogen;

with the proviso that $R_{22}$ is carboxy or contains a sulfo group when $R_{19}$ does not contain a sulpho group;

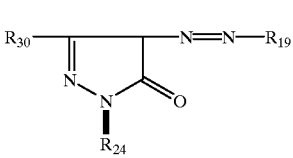

(III)

in which $R_{30}$ is carboxy or $C_{1-4}$alkyl; $R_{24}$ is phenyl, unsubstituted or monosubstituted by sulpho with the proviso that when neither $R_{19}$ nor $R_{24}$ contains a sulpho group, $R_{30}$ is carboxy;

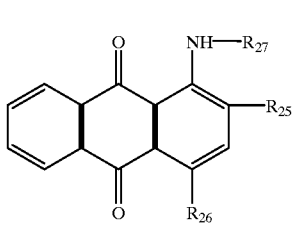

(IV)

wherein $R_{25}$ is sulpho, hydrogen or halogen; with the proviso that when the compound contains one $R_{25}$ group and $R_{25}$ is other than sulpho, at least one $R_{28}$ is carboxy or sulpho, and when the compound contains two $R_{25}$ groups, at least one of them is sulpho;

$R_{27}$ is hydrogen or cyclohexyl $R_{26}$ is 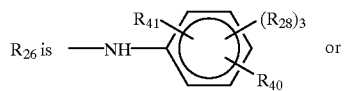 or

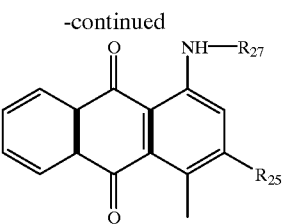

wherein each $R_{28}$ independently is selected from carboxy, $C_{1-4}$alkyl, sulpho, $C_{1-4}$alkoxy, halogen, hydrogen and —NHCO—$C_6H_5$; and $R_{40}$ is hydrogen, methyl, —CH$_2$NHCOC(Cl)=CH$_2$ or —NH—CO—$C_{1-4}$alkyl; and $R_{41}$ is hydrogen or halogen.

more specifically F is preferably F″, where F″ is a compound of formula $F_1$ to $F_{43}$:

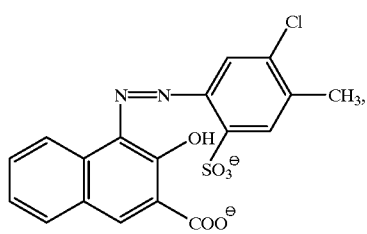

$F_1$

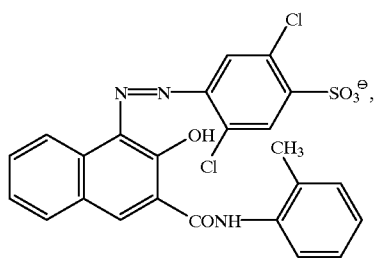

$F_2$

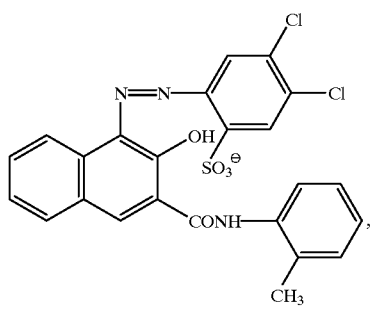

$F_3$

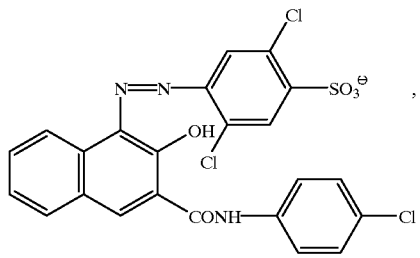

$F_4$

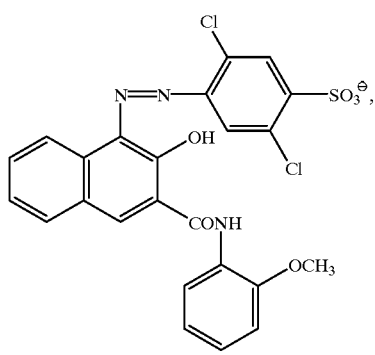
F5
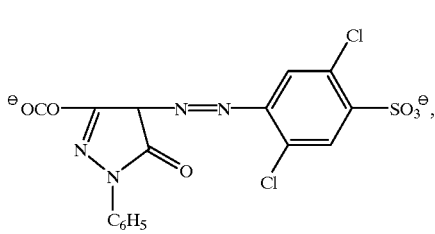
F6
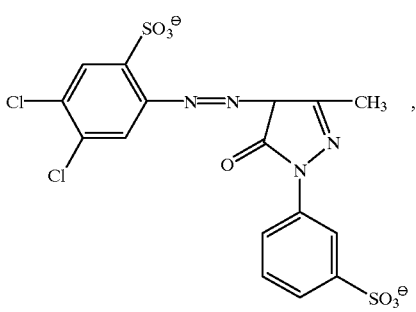
F7
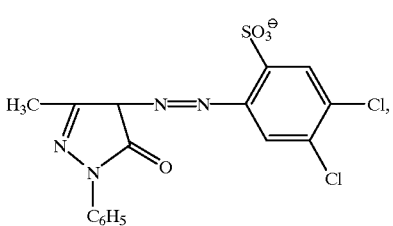
F8
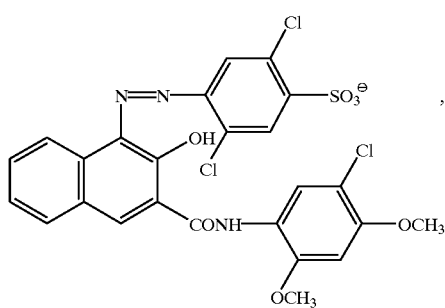
F9

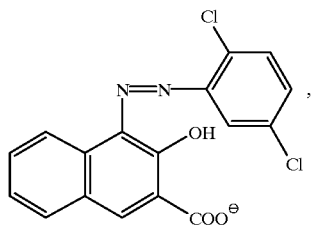
F10
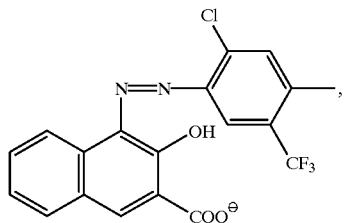
F11
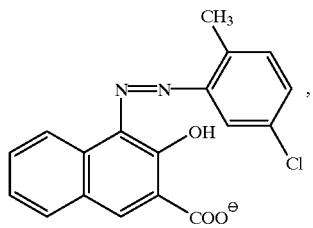
F12
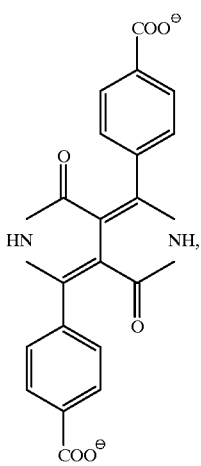
F13
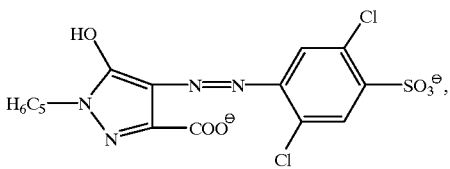
F14
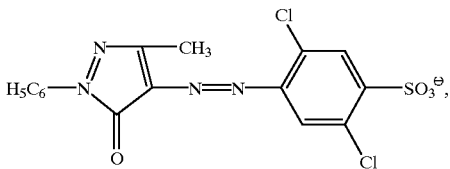
F15

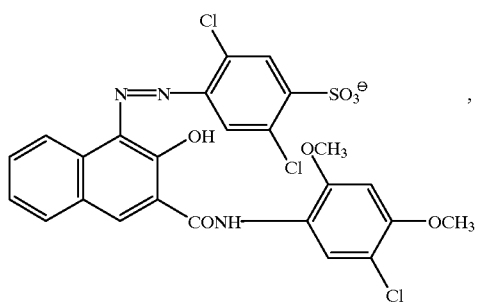
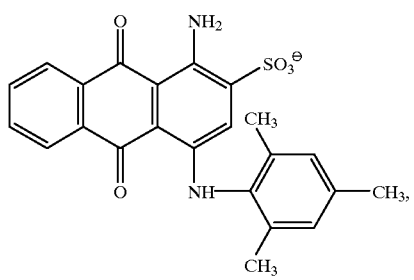
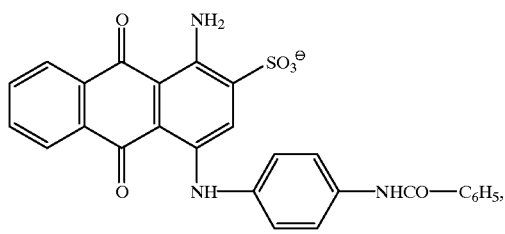
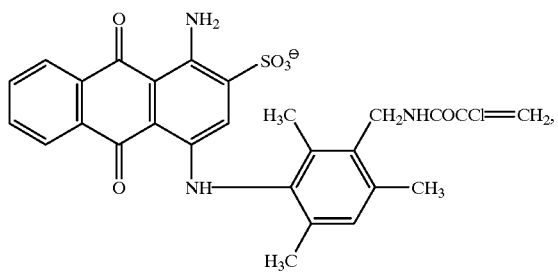
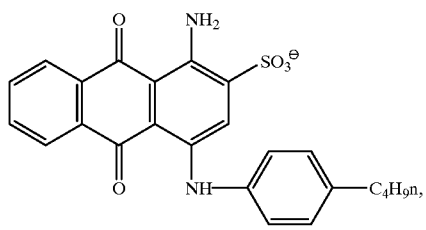
F16
F17
F18
F19
F20

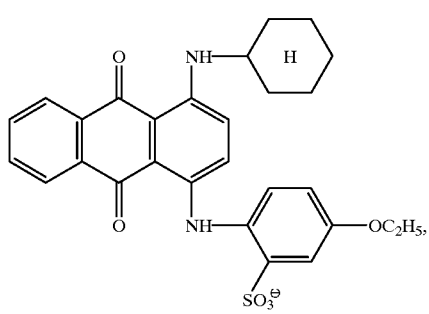
F21
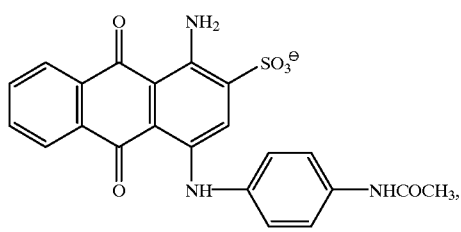
F22
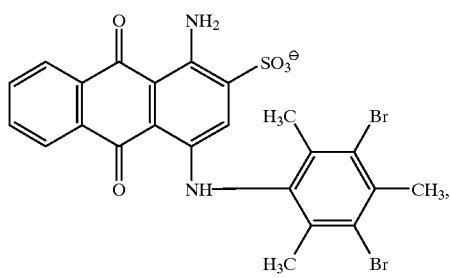
F23
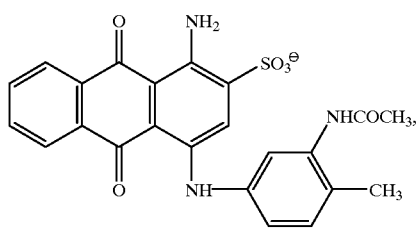
F24
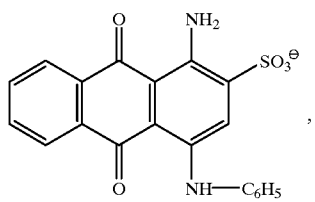
F25
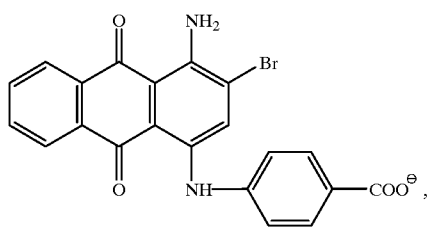
F26

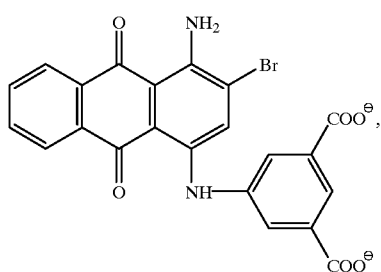
F27
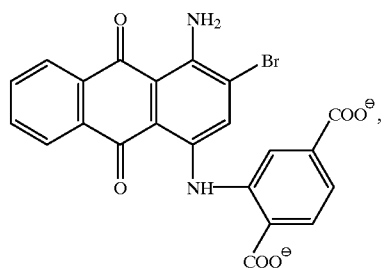
F28
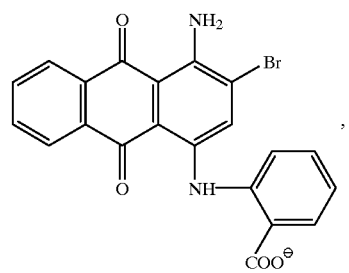
F29
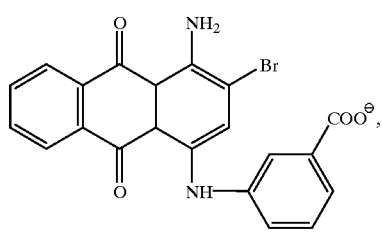
F30
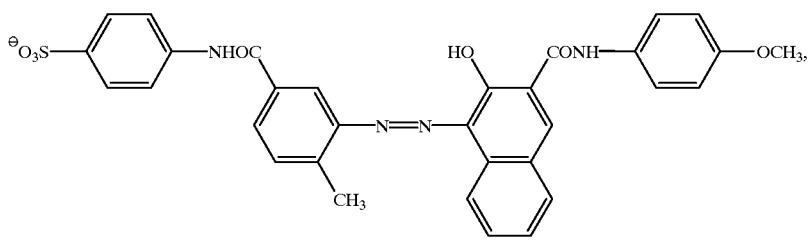
F31
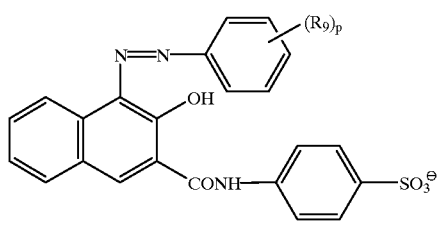
F32 in which each $R_9$ independently is Chloro, Bromo, $C_{1-3}$alkyl or $C_{1-4}$alkoxy and p=1,2 or 3,
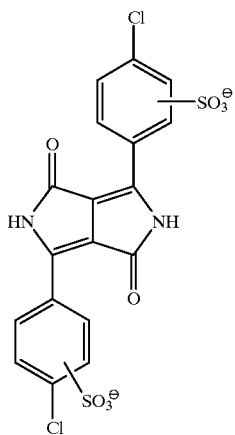
$F_{33}$
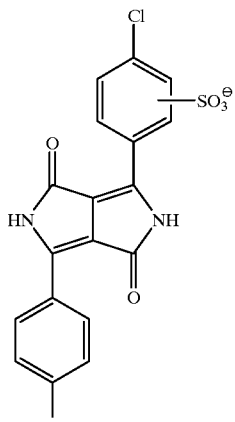
$F_{34}$
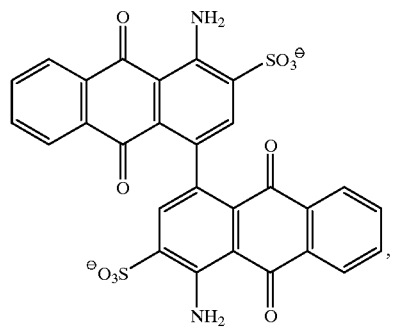
$F_{35}$
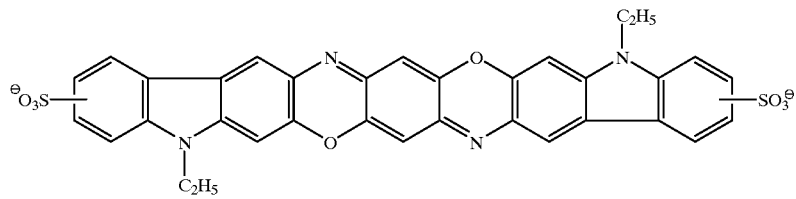
$F_{36}$

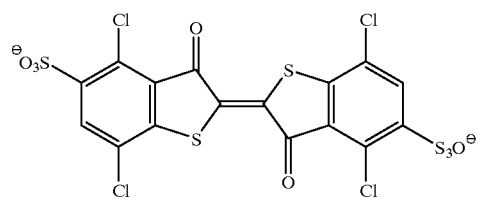
F37
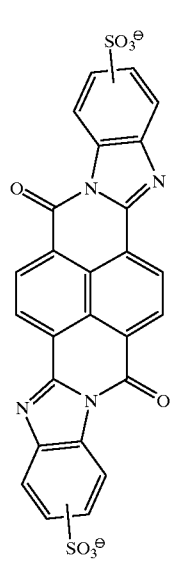
F38
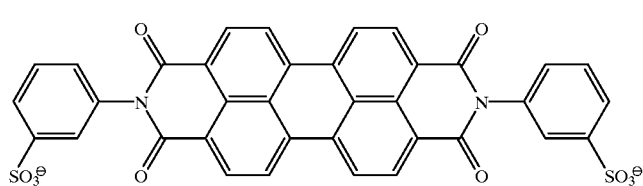
F39
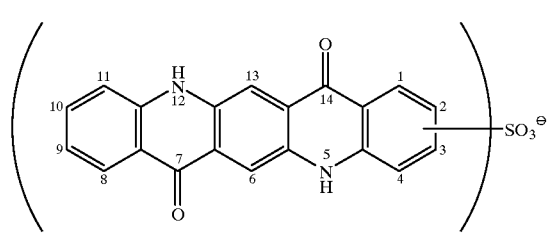
F40
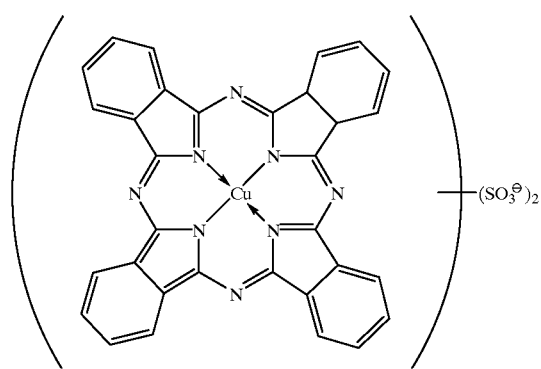
F41

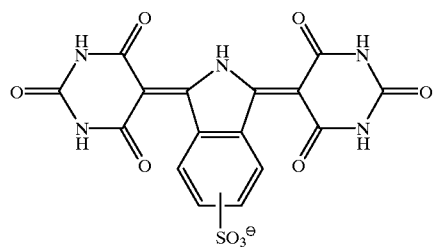

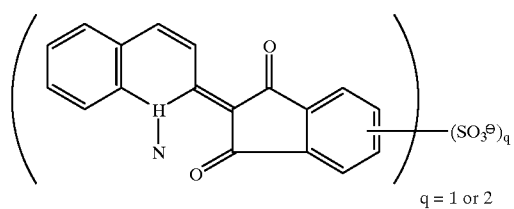

q = 1 or 2

Preferably any sterically hindered amine group present is selected from formulae (a) to (e) below:

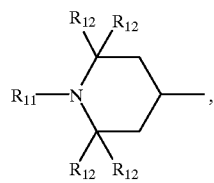

(a)

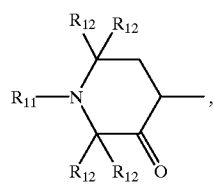

(b)

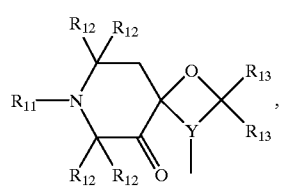

(c)

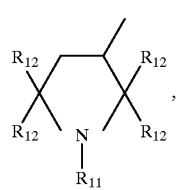

(d)

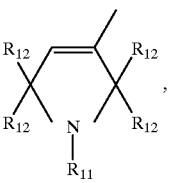

(e)

in which $R_{11}$ is hydrogen or $C_4$alkyl, preferably hydrogen or methyl, more preferably hydrogen;

each $R_{12}$ independently is $C_{1-6}$alkyl, preferably methyl;

both groups $R_{13}$ independently are hydrogen, methyl or ethyl or one group $R_{13}$ is phenyl and the other $R_{13}$ is hydrogen, methyl or ethyl or both groups $R_{13}$ together form a group of —(CH$_2$)—$_{5-11}$ and Y is a group of the formula

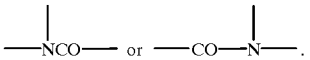

Preferably A is A' where A' is a cationic group derived from a compound selected from A1–A29

$A_1$ 1,3,5-Tri-(1',2',2',6',6'-pentamethylpiperidyl-4'-) trimesinic acid triamide, $A_2$ 2,4-Bis-(2',2',6',6'-tetramethylpiperidyl-4'-amino)-6-chlorotriazine, $A_3$ 2,4,6-Tri-(2',2',6',6'-tetramethylpiperidyl-4'-amino) triazine, $A_4$ Bis-(2',2',6',6'-tetramethylpiperidyl-4'-aminocarbonyl-paraphenylene)-terephthalic acid diamide, a compound of the formula

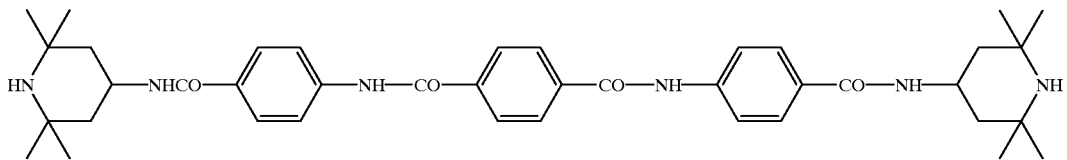

A₅ Bis-(2',2',6',6'-tetramethylpiperidyl-4'-)terephthalic acid amide,

A₆ 2,4-Bis-(2',2',6',6'-tetramethylpiperidyl-4'-amino) quinazoline,

A₇ 2,3-Bis-(2',2',6',6'-tetramethylpiperidyl-4'-amino) quinoxaline,

A₈ 1,4-Bis-(2',2',6',6'-tetramethylpiperidyl-4'-amino) phthalazine,

A₉ 2-Chloro-4,6-bis-(2',2',6',6'-tetramethylpiperidyl-4'-amino)pyrimidine,

A₁₀ 2,5-Dichloro-4,6-bis-(2',2',6',6'-tetramethylpiperidyl-4'-amino)pyrimidine,

A₁₁ 2-Fluoro-5-chloro-4,6-bis-(2',2',6',6'-tetramethylpiperidyl-4'-amino)pyrimidine, A₁₂ 2,4,6-Tri-(2',2',6',6'-tetramethylpiperidyl-4'-amino) pyrimidine, A₁₃ 2,4,6-Tri-(2',2',6',6'-tetramethylpiperidyl-4'-amino)-5-chloropyrimidine,

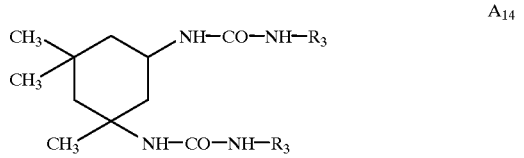
A₁₄

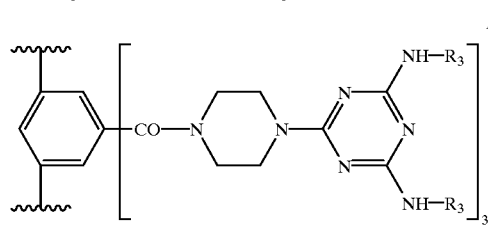
A₁₅

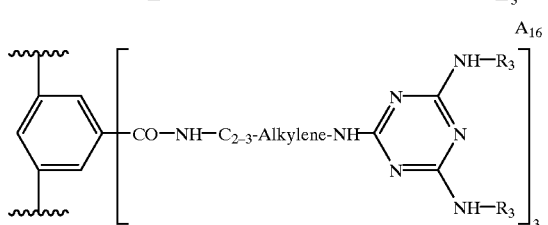
A₁₆

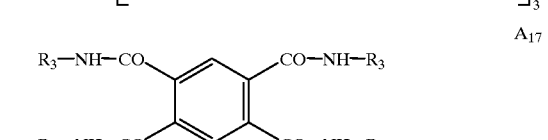
A₁₇

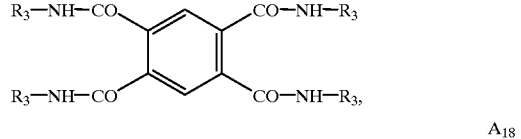
A₁₈

-continued

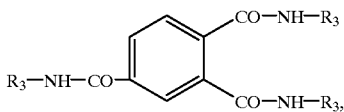
A₁₉

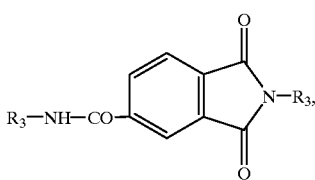
A₂₀

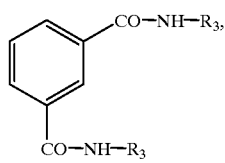
A₂₁

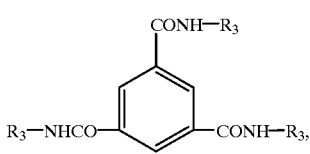
A₂₂

A₂₃ Bis-(1,2,2,6,6-pentamethylpiperidyl-4)-terephthalic acid amide,

A₂₄ Bis-(1,2,2,6,6-pentamethylpiperidyl-4)-isophthalic acid amide,

A₂₅

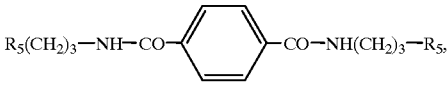
A₂₆

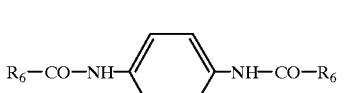
A₂₇

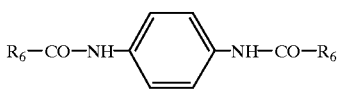
A₂₈

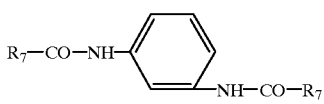

in which $R_3$ is 2,2,6,6-tetramethylpiperidyl-4-;

$R_4$ is a group of formula b) defined above;

$R_5$ is a group of formula c) as defined above, wherein Y is

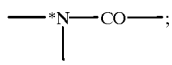

$R_5$ is a group of formula c) as defined above, wherein Y is

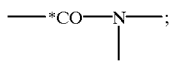

where the * atom is attached to the piperidyl group;

$R_6$ is a group formula d) defined above, and $R_7$ is a group of formula e) defined above; the other symbols appearing in said formulae being as defined above.

The production of the compounds of formula A1 to A29 can be carried out by known methods, preferably through condensation of the corresponding amine with the corresponding carboxylic acid (or carboxylic acid chloride) or, for example, the condensation of the corresponding amine with trichlorotriazine, dichloroquinazoline, dichloroquinoxaline, dichlorophthalazine, tri- or tetrachloropyrimidine. Corresponding compounds containing the groups of formulae a) to e) are known.

The production of the new pigments can be carried out by salting the appropriate dyestuff with a basic compound A by known methods. For example, acid dyestuffs as obtained after production, i.e. in the form of sodium salts, can be reacted in the presence of an adequate amount of mineral acid (for example HCl) with the basic components A to form the salt.

The compounds of formula I are very strong in color, either when they are used in small amounts or when they are used in the usual amounts for other organic pigments. Normal amounts used are from 0.02 to 5%, more preferably 0.06 to 3%, by weight of the substrate to be pigmented. The colorings using the compounds of formula I show excellent light fastness. Furthermore the substrates to which the compounds of formula I have been applied show excellent stability against the detrimental effects of UV light, heat and oxidation.

The following examples illustrate the invention, in which all parts and percentages are by weight and all temperatures given are in ° C.

EXAMPLE 1 a) 10.15 parts of terephthalic acid dichloride are stirred into 70 parts of toluene and 19.5 parts of triacetone diamine, a compound of the formula

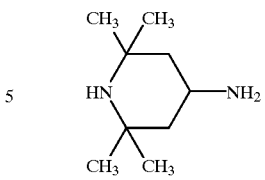

are added at room temperature over 3 hours. The resulting suspension is diluted with a further 30 parts of toluene and then boiled under reflux for 18 hours continually stirring. The resulting precipitate is then filtered, washed with acetone, stirred in 50 parts of water, brought to a pH of about 13 with sodium hydroxide, filtered again, washed with water again and dried under vacuum. The resulting white powder melts at temperatures over 3000.

b) 4.84 parts of 3,4-dichloroanilin-6-sulphonic acid are dissolved in 11 parts of 15% hydrochloric acid, the solution is cooled to 0 to 40° and then it diazotised with 6 parts of 4N $NaNO_2$, the $NaNO_2$ excess being destroyed with amino sulphonic acid. A solution of 3.48 parts of 1-phenyl-3-methyl-5-pyrazolone in 20 parts of water and 2.2 parts of 30% sodium hydroxide while keeping the mixture at 0 to 4% the addition being carried out slowly and under stirring. This is then stirred for 18 hours at room temperature, then heated while stirring for 2 hours to 60°, filtered and the residue is washed with water. It is then dried then taken up in water again and the pH is brought to about 8.5 using dilute NaOH.

c) 4.42 parts of the product of a) above is brought into solution in 30 parts water and 1.9 parts of 33% hydrochloric acid. The mixture of part b) is added slowly over 30 minutes while stirring, and to improve the stirrability further water is added to the mixture. The mixture is the heated for 2½ hours to 60°, cooled to room temperature and the residue is filtered, washed with water and dried, the melting point of the resulting yellow-orange powder is over 3000.

By a method analogous to that of Example 1, further pigments of the formula $F_n$—A in which the symbols defined in the Table below can be prepared from known ocmpound. The nuance of the pigmented substrate is given in the last column.

TABLE

| Example Number | n | F | A | Variation of Coloration |
|---|---|---|---|---|
| 2 | 1 | $F_6$ | $A_1$ | yellow |
| 3 | 1 | $F_6$ | $A_{21}$ | do. |
| 4 | 1 | $F_6$ | $A_5$ | do. |
| 5 | 1 | $F_6$ | $A_4$ | do. |
| 6 | 1 | $F_1$ | $A_{21}$ | red |
| 7 | 1 | $F_7$ | $A_{21}$ | yellow |
| 8 | 1 | $F_1$ | $A_5$ | red |
| 9 | 1 | $F_7$ | $A_5$ | yellow |
| 10 | 1 | $F_1$ | $A_4$ | red |
| 11 | 1 | $F_7$ | $A_4$ | yellow |
| 12 | 1 | $F_1$ | $A_1$ | red |
| 13 | 1 | $F_7$ | $A_1$ | Yellow |
| 14 | 2 | $F_2$ | $A_5$ | red |
| 15 | 2 | $F_3$ | $A_5$ | do. |
| 16 | 2 | $F_8$ | $A_5$ | yellow |
| 17 | 2 | $F_{15}$ | $A_5$ | do. |
| 18 | 2 | $F_{15}$ | $A_2$ | yellow |
| 19 | 2 | $F_5$ | $A_5$ | red |
| 20 | 2 | $F_2$ | $A_2$ | orange-red |

TABLE-continued

| Example Number | n | F | A | Variation of Coloration |
|---|---|---|---|---|
| 21 | 1 | $F_2$ | $A_2$ | red |
| 22 | 2 | $F_5$ | $A_2$ | do. |
| 23 | 2 | $F_4$ | $A_2$ | do. |
| 24 | 2 | $F_4$ | $A_5$ | orange-red |
| 25 | 2 | $F_{16}$ | $A_4$ | red |
| 26 | 2 | $F_{17}$ | $A_5$ | blue |
| 27 | 2 | $F_{26}$ | $A_5$ | do. |
| 28 | 2 | $F_{29}$ | $A_5$ | do. |
| 29 | 2 | $F_9$ | $A_{24}$ | red |
| 30 | 2 | $F_{10}$ | $A_{24}$ | do. |
| 31 | 2 | $F_{11}$ | $A_{24}$ | do. |
| 32 | 2 | $F_{12}$ | $A_{23}$ | do. |
| 33 | 1 | $F_{13}$ | $A_{23}$ | do. |
| 34 | 2 | $F_{14}$ | $A_{22}$ | do. |
| 35 | 2 | $F_{16}$ | $A_{23}$ | do. |
| 36 | 2 | $F_{18}$ | $A_3$ | blue |
| 37 | 2 | $F_{19}$ | $A_8$ | do. |
| 38 | 2 | $F_{20}$ | $A_9$ | do. |
| 39 | 2 | $F_{21}$ | $A_{11}$ | do. |
| 40 | 2 | $F_{22}$ | $A_{17}$ | do. |
| 41 | 2 | $F_{23}$ | $A_{20}$ | do. |
| 42 | 2 | $F_{24}$ | $A_{19}$ | do. |
| 43 | 2 | $F_{25}$ | $A_{14}$ | do. |
| 44 | 2 | $F_{31}$ | $A_{23}$ | red |
| 45 | 1 | $F_{33}$ | $A_{23}$ | do. |
| 46 | 1 | $F_{35}$ | $A_2$ | do. |
| 47 | 1 | $F_{35}$ | $A_5$ | do. |
| 48 | 1 | $F_{36}$ | $A_5$ | violet |
| 49 | 1 | $F_{36}$ | $A_6$ | do. |
| 50 | 1 | $F_{41}$ | $A_7$ | blue |
| 51 | 1 | $F_{37}$ | $A_8$ | red-violet |
| 52 | 2 | $F_{42}$ | $A_9$ | yellow |
| 53 | 2 | $F_{42}$ | $A_{10}$ | do. |
| 54 | 1 | $F_{41}$ | $A_{14}$ | blue |
| 55 | 2 | $F_{41}$ | $A_{17}$ | do. |
| 56 | 2 | $F_{39}$ | $A_{18}$ | red |
| 57 | 1 | $F_{38}$ | $A_6$ | orange |
| 58 | 1 | $F_{43}(a=2)$ | $A_6$ | yellow |
| 59 | 2 | $F_{40}$ | $A_{22}$ | red |

Examples 48–50, 52–55 and 57–59 are mixtures.

Application Example A:

4 parts of the pigment of Example 1 are grounded together with 96 parts of a mixture of 50 parts of 60% solution of Coco-aldehyde-melamine resin having a fat content in Xylene of 32%, 30 parts of 50% melamine resin solution in butanol, 10 parts of xylene and 10 parts of ethylene glycol monoethylether for 24 hours in a ball mill. The resulting dispersion is then sprayed onto an aluminum sheet, dried for 30 minutes in air and then stoved for 30 minutes at 120°. A brilliant reddish yellow film with very good light and weathering properties results.

Application Example B

A 0.1% dye colored PVC sheet (colored pigment to white pigment ratio being 1:5) can be made as follows;

16.5 parts of a mixture of equal parts of dioctylphthalate and dibutylphthalate are mixed 0.05 parts of the pigment of Example 1 and 0.25 parts of titanium dioxide.

33.5 parts of polyvinylchloride are added. The mixture is then rolled between two rollers to produce a sheet that is cut up with a spatula and rolled together again. One of the rollers is kept at a temperature of 40° the other at a temperature of 140°. Finally the mixture is then taken off as a sheet and pressed between to polishing metal plates 160° for 5 minutes.

A reddish yellow colored PVC folio having a high brilliance and very good migration and light fastness properties result.

Application Examples A & B can be repeated using instead of the pigment of Example 1, an equivalent amount of any one of the products of Examples 2–59 inclusive.

We claim:

1. A compound of the formula I:

$$F_n \cdot A \qquad (I)$$

wherein

F is a residue of a metal-free anionic dyestuff having 1–4 acid groups;

n is 1 to 2;

A is

$A_{25}$

$A_{26}$

$A_{27}$

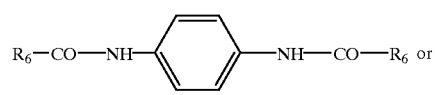

$A_{28}$

$A_{29}$ $R_4$ is a group of formula (b)

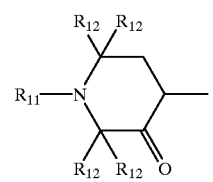

(b)

$R_5$ is a group of formula (c)

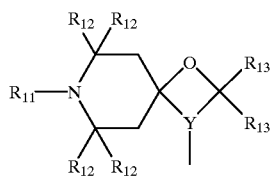 (c)

wherein Y is =*N—CO—;
$R_{5'}$ is a group of formula (c) wherein Y is —*CO—N=;
the *atom is attached to the piperidyl group;
$R_6$ is a group of formula (d)

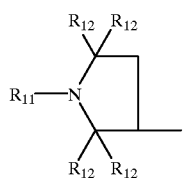 (d)

$R_7$ is a group of formula (e)

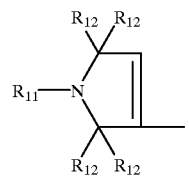 (e)

$R_{11}$ is H or $C_{1-4}$ alkyl;
$R_{12}$ is each independently $C_{1-6}$ alkyl; and
$R_{13}$ is each independently H, methyl, or ethyl; or one is phenyl and the other is H, methyl, or ethyl; or both together form a group —$(CH_2)_{5-11}$—.

2. A compound of claim 1 wherein $R_{11}$ is H or methyl.
3. A compound of claim 2 wherein $R_{11}$ is H.
4. A compound of claim 1 wherein $R_{12}$ is methyl.
5. A process of coloring a substrate which comprises applying to said substrate a compound of claim 1.

* * * * *